United States Patent
Cui et al.

(10) Patent No.: US 12,074,818 B2
(45) Date of Patent: Aug. 27, 2024

(54) TCI CHAIN DESIGN

(71) Applicant: Apple Inc., Cupertino, CA (US)

(72) Inventors: Jie Cui, San Jose, CA (US); Yang Tang, San Jose, CA (US); Qiming Li, Beijing (CN); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Xiang Chen, Campbell, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 17/593,280

(22) PCT Filed: Jan. 13, 2021

(86) PCT No.: PCT/CN2021/071583
§ 371 (c)(1),
(2) Date: Sep. 14, 2021

(87) PCT Pub. No.: WO2022/151090
PCT Pub. Date: Jul. 21, 2022

(65) Prior Publication Data
US 2023/0171054 A1    Jun. 1, 2023

(51) Int. Cl.
*H04W 72/21*    (2023.01)
*H04L 5/00*    (2006.01)

(52) U.S. Cl.
CPC ............ *H04L 5/0048* (2013.01); *H04L 5/001* (2013.01); *H04W 72/21* (2023.01)

(58) Field of Classification Search
CPC ... H04L 5/0048; H04L 5/0053; H04L 5/0091; H04L 5/0023; H04W 72/21
See application file for complete search history.

(56) References Cited

U.S. PATENT DOCUMENTS

| | | | |
|---|---|---|---|
| 11,115,110 B2* | 9/2021 | Zhou | H04B 7/088 |
| 11,323,222 B2* | 5/2022 | Qin | H04L 5/0053 |

(Continued)

FOREIGN PATENT DOCUMENTS

| | | |
|---|---|---|
| CN | 111082909 | 4/2020 |
| CN | 111245488 | 6/2020 |

(Continued)

OTHER PUBLICATIONS

Ericsson, "On beam indication, measurement, and reporting", 3GPP TSG-RAN WG1 NR Ad hoc #3, R1-1716350, Sep. 21, 2017, 13 sheets.

*Primary Examiner* — Ahmed Elallam
(74) *Attorney, Agent, or Firm* — Fay Kaplun & Marcin, LLP

(57) ABSTRACT

A user equipment (UE) receives TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determines a TCI chain comprising the first, second and third signals so that channel measurements for each one of the first, second and third signals are applied to channel measurements for each other one of the first, second and third signals, wherein at least one of the first, second or third signals is an uplink (UL) signal.

20 Claims, 6 Drawing Sheets

(56) References Cited

U.S. PATENT DOCUMENTS

| | | | | |
|---|---|---|---|---|
| 11,516,813 B2* | 11/2022 | Huang | ................ | H04L 5/0048 |
| 11,637,666 B2* | 4/2023 | Grant | ................ | H04L 5/0044 |
| | | | | 370/329 |
| 11,638,281 B2* | 4/2023 | Mo | ................ | H04B 7/0691 |
| | | | | 370/329 |
| 11,889,323 B2* | 1/2024 | Zhang | ................ | H04B 17/345 |
| 2019/0260532 A1 | 8/2019 | Manolakos et al. | | |
| 2020/0145062 A1* | 5/2020 | Jung | ................ | H04W 72/23 |
| 2020/0351055 A1 | 11/2020 | Manolakos et al. | | |
| 2022/0123891 A1* | 4/2022 | Ji | ................ | H04B 17/104 |
| 2022/0159579 A1* | 5/2022 | Cirik | ................ | H04W 52/242 |
| 2022/0159684 A1* | 5/2022 | Mo | ................ | H04B 7/0874 |

FOREIGN PATENT DOCUMENTS

| | | | |
|---|---|---|---|
| CN | 111511010 | | 8/2020 |
| CN | 113923780 A | * | 1/2022 |

* cited by examiner

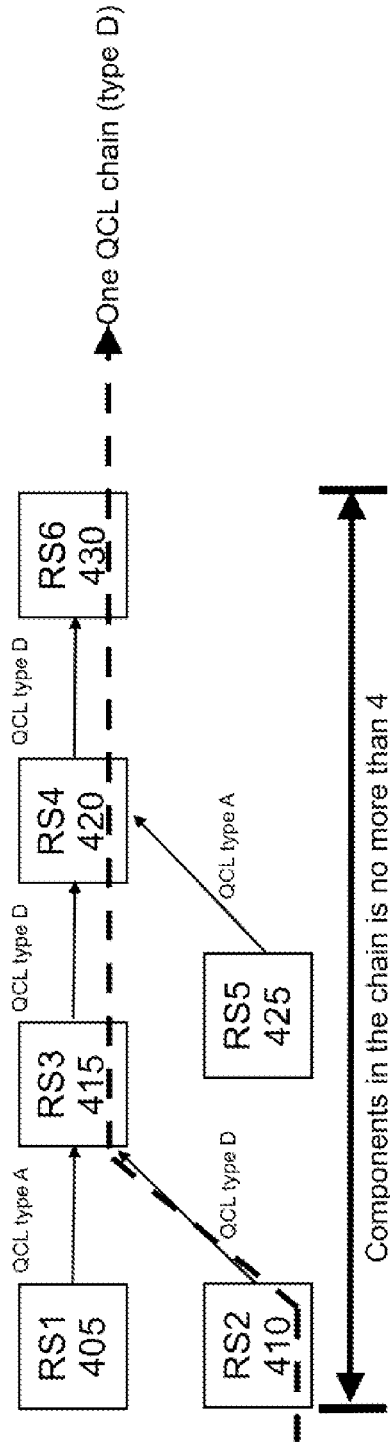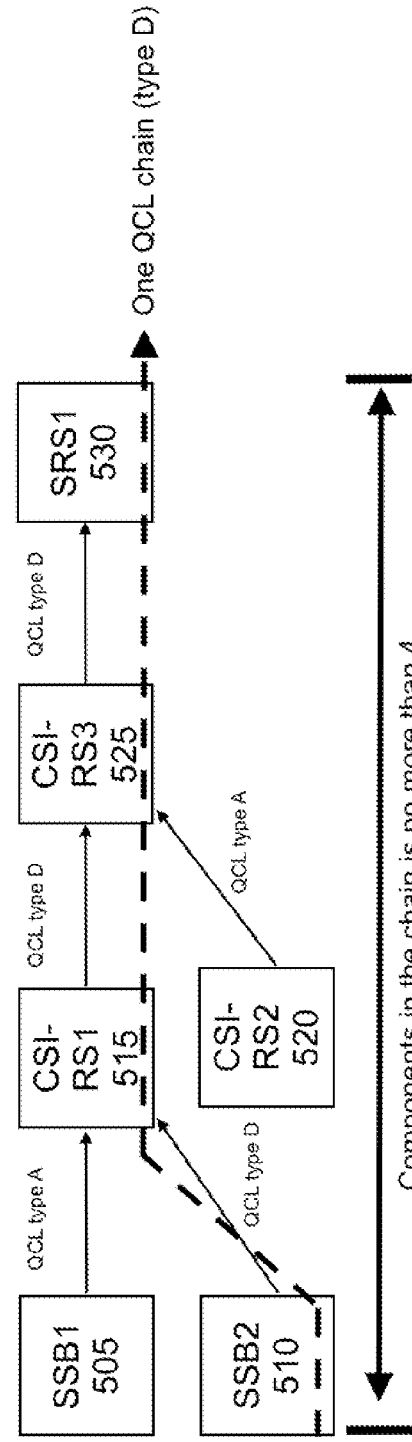
Fig. 4
Fig. 5

TCI CHAIN DESIGN

BACKGROUND INFORMATION

A transmission configuration indicator (TCI) state contains parameters for configuring a quasi co-location (QCL) relationship between one or more reference signals (RS) and corresponding antenna ports. For example, the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set may be associated with a QCL relationship. Two quasi co-located signals experience very similar channel conditions, such that determining the channel properties of one of the signals will substantially aid the channel property determination of the other signal.

A TCI chain may be formed when a first signal e.g. a DMRS is QCLed to a second RS in the active TCI state of the first RS, and the second RS is QCLed to a third RS in the active TCI state of the second RS, provided the QCL type is the same. When the TCI chain is formed, each RS in the chain is QCLed to each other RS in the chain. In current specifications, a TCI chain may have a maximum of four RS on the downlink (DL).

SUMMARY

Some exemplary embodiments are related to a processor of a user equipment (UE) configured to perform operations. The operations include receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals is an uplink (UL) signal.

Other exemplary embodiments are related to a user equipment (UE) having a transceiver and a processor. The transceiver is configured to communicate with a network. The processor is communicatively coupled to the transceiver and configured to perform operations. The operations include receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals is an uplink (UL) signal.

Still further exemplary embodiments are related to a processor of a user equipment (UE) configured to perform operations. The operations include receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals belongs to a serving cell different from another one of the first, second or third signals.

Additional exemplary embodiments are related to a user equipment (UE) having a transceiver and a processor. The transceiver is configured to communicate with a network. The processor is communicatively coupled to the transceiver and configured to perform operations. The operations include receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals belongs to a serving cell different from another one of the first, second or third signals.

BRIEF DESCRIPTION OF THE DRAWINGS

FIG. 4 shows a diagram for signals in an exemplary TCI chain according to various exemplary embodiments described herein.

FIG. 5 shows a diagram for signals in an exemplary TCI chain including UL signals according to various exemplary embodiments described herein.

DETAILED DESCRIPTION

Figure 1:
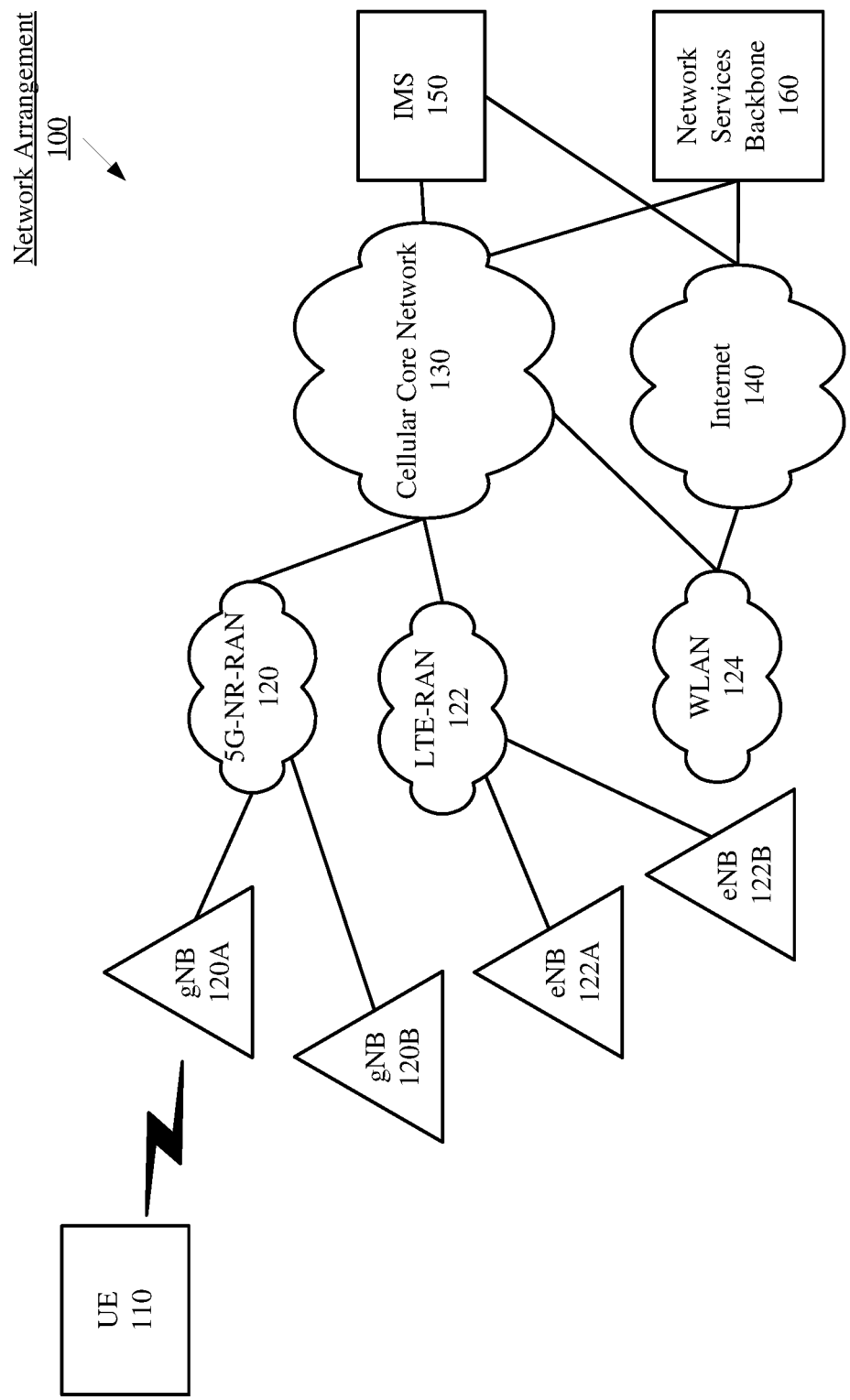
FIG. 1 shows a network arrangement according to various exemplary embodiments.

The exemplary embodiments may be further understood with reference to the following description and the related appended drawings, wherein like elements are provided with the same reference numerals. The exemplary embodiments describe configurations for transmission configuration indicator (TCI) chains. In some embodiments, a TCI chain may include an uplink (UL) reference signal (RS) or channel in a mixed TCI chain also including downlink (DL) RS. In other embodiments, the TCI chain may comprise only UL RS/channels. In still other embodiments, the RS in a TCI chain may include RS/channels from different serving cells.

According to some exemplary embodiments, the UL signals in a TCI chain may include, but are not limited to, a sounding reference signal (SRS), a random access channel (RACH), a physical uplink control channel (PUCCH) and/or a physical uplink shared channel (PUSCH), while the DL signals in a TCI chain may include, but are not limited to, a signal synchronization block (SSB), a demodulation reference signal (DMRS) and/or a channel state information RS (CSI-RS). The synchronization signal block (SSB) comprises a primary synchronization signal (PSS), a secondary synchronization signal (SSS), a physical broadcast channel (PBCH) demodulation reference signal (DMRS) and PBCH data transmitted via a specific beam radiated in a certain direction.

In current specification TS 38.133, a user equipment (UE) may be configured with a TCI chain including downlink (DL) reference signals (DLRS) only. Further, the maximum allowed length X for a TCI chain is X=4.

According to some exemplary embodiments described herein, the maximum length of the TCI chain may be extended to X>4, e.g. X=5 or X=6. In some exemplary embodiments, the maximum length of the TCI chain may be dependent on the types of signals comprising the TCI chain, e.g. DL or UL signals. Further, the maximum length for a TCI chain may be dependent on a UE capability.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
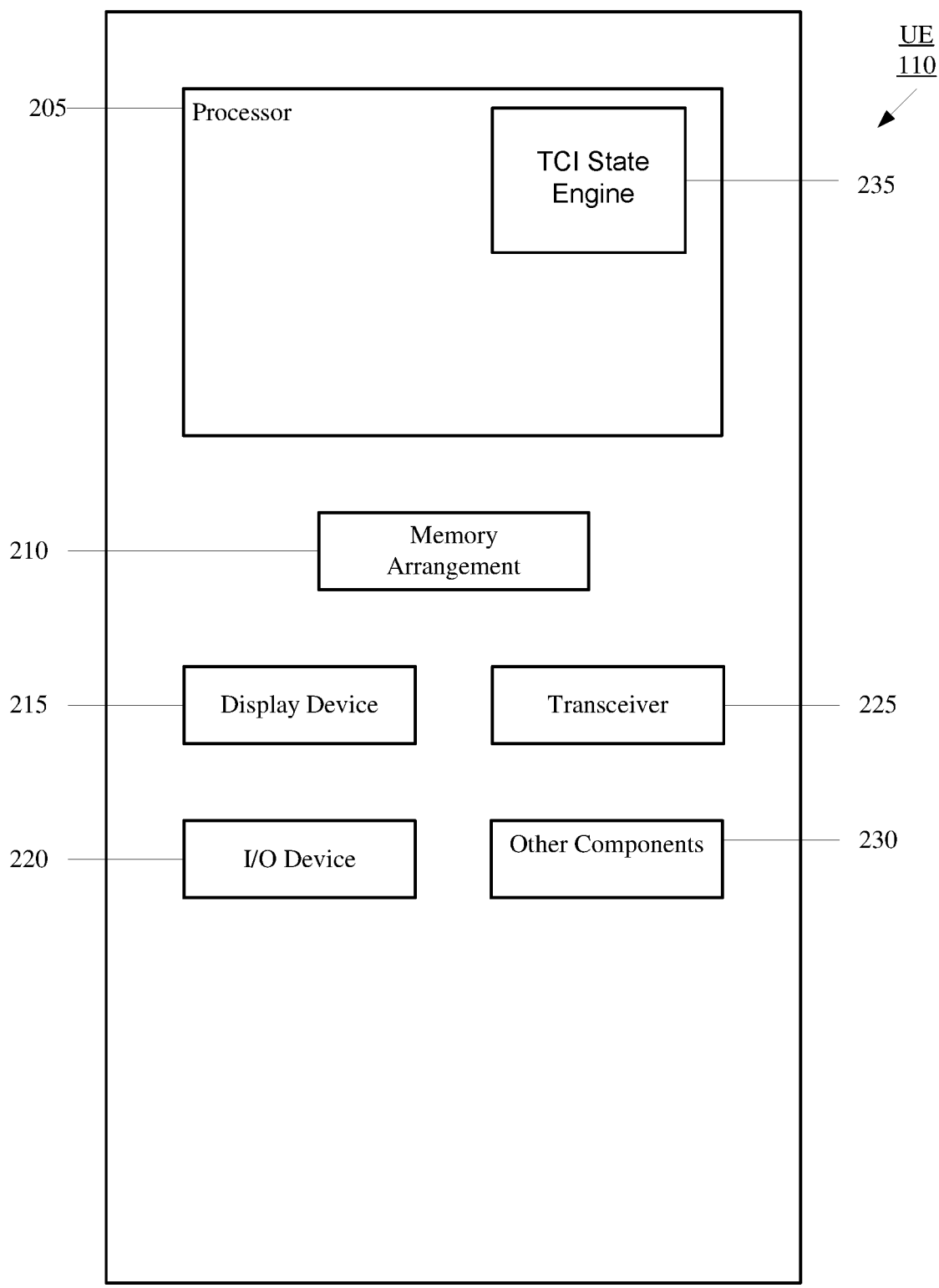
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a TCI state engine 235. The TCI state engine 235 may perform operations including applying a TCI state change indicated by the network. A list of up to M TCI states may be configured for the UE, wherein an active TCI state for a first signal references a second signal to which a QCL relationship is applied. When the second signal has an active TCI state referencing a third signal with the same QCL type as that between the first and second signals, a TCI chain is formed. The TCI chain according to the exemplary embodiments of the present disclosure will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
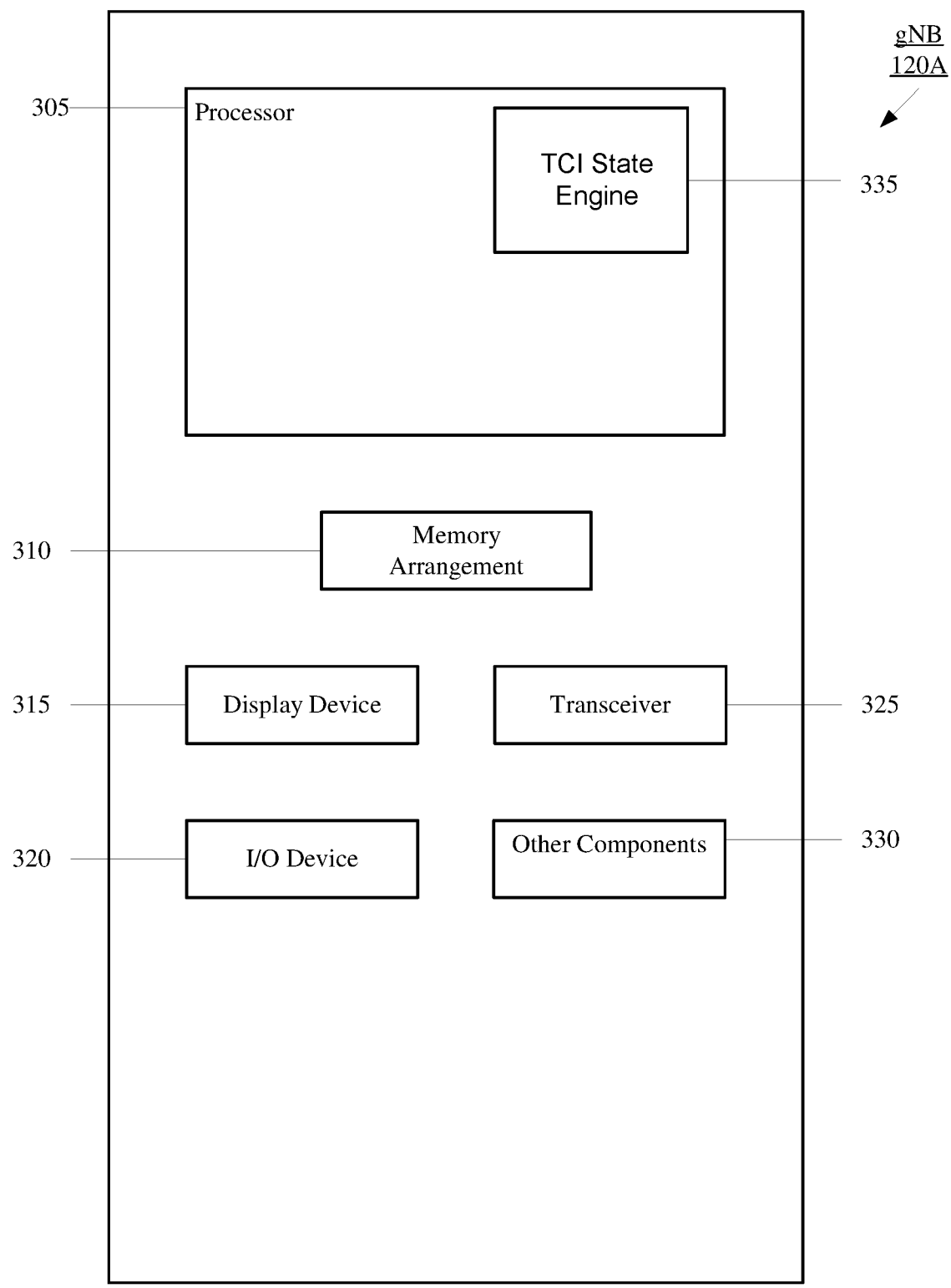
FIG. 3 shows an exemplary network cell according to various exemplary embodiments.

FIG. 3 shows an exemplary network cell, in this example gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a TCI state engine 335. The TCI state engine 335 may perform operations including indicating TCI state configurations to a UE, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

TCI Chain Enhancement

A transmission configuration indicator (TCI) state contains parameters for configuring a quasi co-location (QCL) relationship between one or more downlink (DL) reference signals (DLRS) and corresponding antenna ports, e.g. the demodulation reference signal (DMRS) ports of the physical downlink shared channel (PDSCH), the DMRS port of the physical downlink control channel (PDCCH), or the channel state indicator reference signal (CSI-RS) port(s) of a CSI-RS resource set. Two quasi co-located signals experience very similar channel conditions, such that determining the channel properties of one of the signals will substantially aid the channel estimation of the other signal.

In the existing RRM specification TS38.133 section 3.6.7, the TCI chain has been specified in the following manner. A reference signal is considered to be QCLed to another reference signal if it is in the same TCI chain as the other reference signal, provided that the number of reference signals in the chain is no more than 4. It is assumed there is a single QCL type per TCI chain. A TCI chain consists of an SSB, and one or more CSI-RS resources, and the TCI state of each reference signal includes another reference signal in the same TCI chain. The DMRS of PDCCH or PDSCH is QCLed with the reference signal in its active TCI state and any other reference signal that is QCLed, based on above criteria, with the reference signal in the active TCI state.

Existing QCL types defined in 3GPP TS 38.214 include QCL-TypeA, QCL-TypeB, QCL-TypeC and QCL-TypeD. QCL-TypeA relates to Doppler shift, Doppler spread, average delay and delay spread. QCL-TypeB relates to Doppler shift and Doppler spread. The measurements for types A and B may be used to e.g. determine channel state information (CSI). QCL-TypeC relates to Doppler shift and average delay, and the measurements may be used to e.g. calculate reference signal received power (RSRP). Thus, QCL types A-C relate to timing and frequency error tracking information being shared across the ports corresponding to QCLed signals. QCL-TypeD relates to spatial Rx parameters and is used to support beamforming.

A user equipment (UE) may be configured with a list of up to M TCI state configurations within the higher layer parameters, e.g. M=8, which may be transmitted to the UE from the network in a medium access layer (MAC) control element (CE), a DCI message, or a radio resource control (RRC) activation command.

FIG. 4 shows a diagram 400 for signals in an exemplary TCI chain according to various exemplary embodiments described herein. As shown in FIG. 4, a first RS (RS1) 405 is QCLed to a third RS (RS3) 415 with a QCL TypeA relationship. A second RS (RS2) 410 is QCLed to RS3 415 with a QCL TypeD relationship. RS3 415 is QCLed to a fourth RS (RS4) 420 with a QCL TypeD relationship. RS3 415 is QCLed to a fourth RS (RS4) 420 with a QCL TypeD relationship. A fifth RS (RS5) 425 is QCLed to RS4 420 with a QCL TypeA relationship. RS4 420 is QCLed to a sixth RS (RS6) 430 with a QCL TypeD relationship.

A TCI chain is formed including RS2 410, RS3 415, RS4 420 and RS6 430 based on the above-described criteria, e.g. the chain comprises four or fewer RS and the QCL type i.e. QCL TypeD is the same. Thus, the spatial Rx parameters derived from each of the RS in the chain may be used for each other one of the RS in the chain. The timing and frequency error parameters derived from RS1 405 may be used for RS3 415 (having a QCL TypeA relationship), and the timing and frequency parameters derived from RS5 425 may be used for RS4 420 (having a QCL Type A relationship). However, RS1 405 and RS5 425, in this example, are not included in any TCI chain because the QCL type is not identical to the QCL type for the RS in the active TCI state of RS1 405 and RS5 425 (RS3 415 and RS4 420, respectively).

According to various exemplary embodiments described herein, a TCI chain may be configured to contain UL components, including ports for, e.g. UL RS and/or UL channels. A TCI chain may be configured with UL components only or in a mixed TCI chain also including DL components. According to various exemplary embodiments described herein, the UE 110 can use the Rx beam (QCL type D) from one component in a QCL type D TCI chain to another component in the same QCL type D TCI chain for reception/transmission. The UE 110 may also use the T/F tracking information (QCL type A/B/C) from one component in a QCL type A/B/C TCI chain to another component in the same QCL type A/B/C TCI chain for reception/transmission. The components in the TCI chain may consider the RS/channel from different serving cells at the UE, with some limitations imposed.

According to various exemplary embodiments described herein, the UL RS in a TCI chain may be, but is not limited to, the sounding reference signal (SRS). The UL channels in a TCI chain may be, but are not limited to, the RACH, PUCCH, and PUSCH. Considering the potential inclusion of UL components, the length of the TCI chain may be configured in various manners.

In a first example, the maximum length X of the TCI chain may be equal to four (X=4), e.g., unchanged from current specifications. According to one embodiment, the TCI chain may comprise of an SSB and one or more CSI-RS resources (on the DL), and one or more SRS or channel resources (on the UL). As discussed above, the TCI state of each RS includes another RS in the same TCI chain.

FIG. 5 shows a diagram 500 for signals in an exemplary TCI chain including UL signals according to various exemplary embodiments described herein. As shown in FIG. 5, a first SSB (SSB1) 505 is QCLed to a first CSI-RS (CSI-RS1) 515 with a QCL TypeA relationship. A second SSB (SSB2) 510 is QCLed to CSI-RS1 515 with a QCL TypeD relationship. A second CSI-RS (CSI-RS2) 520 is QCLed to a third CSI-RS (CSI-RS2) 525 with a QCL TypeA relationship. The CSI-RS1 515 is QCLed to the CSI-RS3 525 with a QCL TypeD relationship. The CSI-RS3 525 is QCLed to an SRS (SRS1) 530 with a QCL TypeD relationship.

A TCI chain is formed including the SSB2 510, CSI-RS1 515, CSI-RS3 525 and SRS1 530 based on the above-described criteria, e.g., the chain comprises 4 or fewer RS and the QCL type i.e., QCL TypeD is the same. Thus, the spatial Rx parameters derived from each of the RS in the chain may be used for each other one of the RS in the chain. The timing and frequency error parameters derived from the SSB1 505 may be used for the CSI-RS1 515 (having a QCL TypeA relationship), and the timing and frequency parameters derived from the CSI-RS2 520 may be used for the CSI-RS3 525 (having a QCL TypeA relationship). However, the SSB1 505 and the CSI-RS2 520, in this example, are not included in the TCI chain because the QCL type is not identical to the QCL type for the RS in the active TCI state of the SSB1 505 and the CSI-RS2 520 (the CSI-RS1 515 and CSI-RS3 525, respectively).

Similar to current specifications, the DMRS of the PDCCH or PDSCH may be QCLed with the reference signal in its active TCI state and any other reference signal that is QCLed, based on the above criteria, with the reference signal in the active TCI state.

According to another embodiment, the PUCCH, PUSCH or RACH may be QCLed with the reference signal in its active TCI state and any other reference signal that is QCLed, based on above criteria, with the reference signal in the active TCI state.

In a second example, the maximum length X of the TCI chain may be extended relative to the existing TCI length, e.g. from X=4 to X>4 (e.g. X=5 or X=6). An increased allowable length for the TCI chain may provide more flexibility to the network, but may have an impact on UE memory. For example, an increased TCI chain length may require the UE 110 to perform T/F tracking for an increased number of signals.

Figure 6:
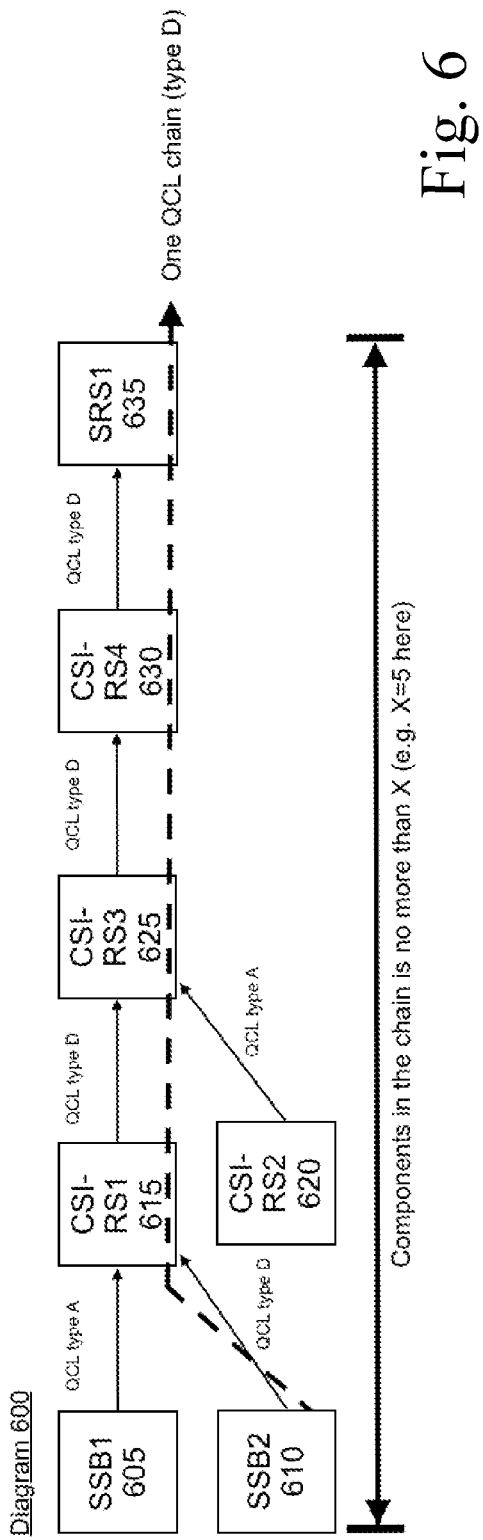
FIG. 6 shows a second diagram for signals in an exemplary TCI chain including UL signals according to various exemplary embodiments described herein.

FIG. 6 shows a diagram 600 for signals in an exemplary TCI chain including UL signals according to various exemplary embodiments described herein. FIG. 6 shows an example of the TCI length being greater than X=4. In this example, X=5. As shown in FIG. 6, a first SSB (SSB1) 605 is QCLed to a first CSI-RS (CSI-RS1) 615 with a QCL TypeA relationship. A second SSB (SSB2) 610 is QCLed to CSI-RS1 615 with a QCL TypeD relationship. A second CSI-RS (CSI-RS2) 620 is QCLed to a third CSI-RS (CSI-RS2) 625 with a QCL TypeA relationship. The CSI-RS1 615 is QCLed to the CSI-RS3 625 with a QCL TypeD relationship. The CSI-RS3 625 is QCLed to the CSI-RS4 630 with a QCL TypeD relationship. The CSI-RS4 630 is QCLed to an SRS (SRS1) 635 with a QCL TypeD relationship.

Again, the difference between the TCI chain in FIG. 5 and the TCI chain in FIG. 6 is that the FIG. 6 TCI chain includes 5 signals (e.g., X=5) versus the 4 signals (e.g., X=4) included in FIG. 5. Thus, an extra CSI-RS (e.g., CSI-RS4 630) is included in the TCI chain. The TCI chain is formed including SSB2 610, CSI-RS1 615, CSI-RS3 625, CSI-RS 630 and SRS1 635. Again, the spatial Rx parameters derived from each of the RS in the chain may be used for each other one of the RS in the chain. The additional RS may allow for a more accurate channel estimation. The remainder of the use of the TCI chain is the same as that described for FIG. 5 and will not be described again.

According to a third example, the maximum length X of the TCI chain may vary based on the components included in the chain. If the TCI chain includes DL components only or UL components only then the existing length may be four, similar to the first option discussed above. However, if the TCI chain includes both DL and UL components, the existing length X may be extended to X>4 (e.g. X=5), similar to the second option discussed above. Thus, for the requirements specified in 3GPP TS38.133, a reference signal is considered to be QCLed to another reference signal if it is in the same TCI chain as the other reference signal, provided that the number of RSs in the DL or UL chain is no more than 4. It is assumed there is a single QCL type per TCI chain. Additionally, for the requirements specified in 3GPP TS38.133, a reference signal is considered to be QCLed to another reference signal if it is in the same TCI chain as the other reference signal, provided that the number of RSs in the mixed DL/UL chain is no more than X, X>4 (e.g. X=5). It is assumed there is a single QCL type per TCI chain.

A DL TCI chain may comprise of an SSB, and one or more CSI-RS resources, and the TCI state of each RS includes another RS in the same TCI chain. A UL TCI chain may comprise of one or more SRS resources, and the TCI state of each Reference Signal includes another Reference Signal in the same TCI chain.

A mixed TCI chain may comprise of an SSB, and one or more CSI-RS resources, and one or more SRS resources, and the TCI state of each RS includes another RS in the same TCI chain. The DMRS of the PDCCH or the PDSCH may be QCLed with the RS in its active TCI state and any other RS that is QCLed, based on the above criteria, with the RS in the active TCI state. The PUCCH or PUSCH or RACH may be QCLed with the RS in its active TCI state and any other RS that is QCLed, based on above criteria, with the RS in the active TCI state. The network may or may not indicate the chain type to the UE.

Various options are available regarding whether or not RSs from different serving cells are allowed to be configured in a same TCI chain. In a first option, the RSs in one TCI chain are required to belong to an identical serving cell. The TCI chain including RSs from the same serving cell may include both DL and UL RS, as discussed above.

In a second option, the RSs in a QCL typeD TCI chain may belong to different serving cells for the target UE, while the RSs in a QCL typeA/B/C TCI chain are required to belong to the same serving cell. The RSs in the TCI chain may include both DL and UL RS in the TCI chain. However, the following limitations may be imposed for the TCI chain that includes RSs belonging to different serving cells.

In one embodiment, the RSs in the TCI chain shall be on CBM bands. That is, the TCI chain may include RSs for bands from a group of bands for which the UE uses a common Rx beam. In another embodiment, the RSs in the TCI chain shall be on an identical band. The UE uses a common Rx beam for all the serving cells on the identical band.

In a third option, the RSs in a QCL typeA/B/C/D TCI chain can belong to different serving cells for the target UE. The same limitations may be imposed as discussed above with respect to option two, e.g. the RSs shall be on CBM bands or on an identical band.

Figure 7:
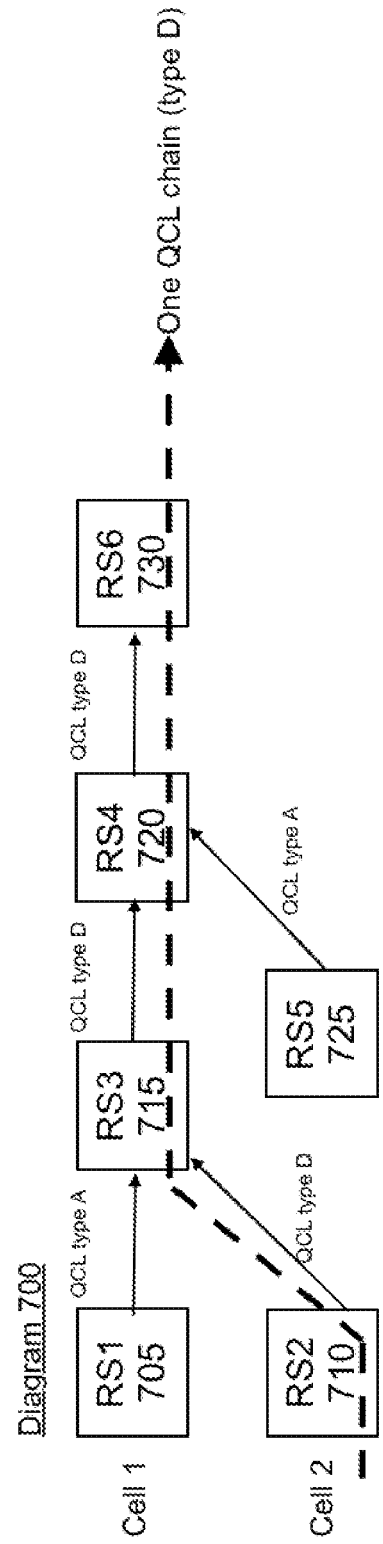
FIG. 7 shows a diagram for signals in an exemplary TCI chain including signals from different serving cells according to various exemplary embodiments described herein.

FIG. 7 shows a diagram 700 for signals in an exemplary TCI chain including signals from different serving cells according to various exemplary embodiments described herein. As shown in FIG. 7, a first RS (RS1) 705 on serving cell 1 is QCLed to a third RS (RS3) 715 on serving cell 1 with a QCL TypeA relationship. A second RS (RS2) 710 serving cell 2 is QCLed to the RS3 715 with a QCL TypeD relationship. The RS3 715 is QCLed to a fourth RS (RS4) 720 on serving cell 1 with a QCL TypeD relationship. A fifth RS (RS5) 725 on serving cell 2 is QCLed to the RS4 720 with a QCL TypeA relationship. The RS4 720 is QCLed to a sixth RS (RS6) 730 on serving cell 1 with a QCL TypeD relationship.

A TCI chain is formed including the RS2 710 on serving cell 2, the RS3 715 on serving cell 1, the RS4 720 on serving cell 1 and the RS6 730 on serving cell 1, based on the above-described criteria, e.g., the chain comprises four or fewer RS and the QCL type i.e., QCL TypeD is the same. Additionally, because the RSs in the TCI chain are from different serving cells, it may be required for the serving cells 1 and 2 to be on a same band or on different bands in a CBM group.

Figure 8:
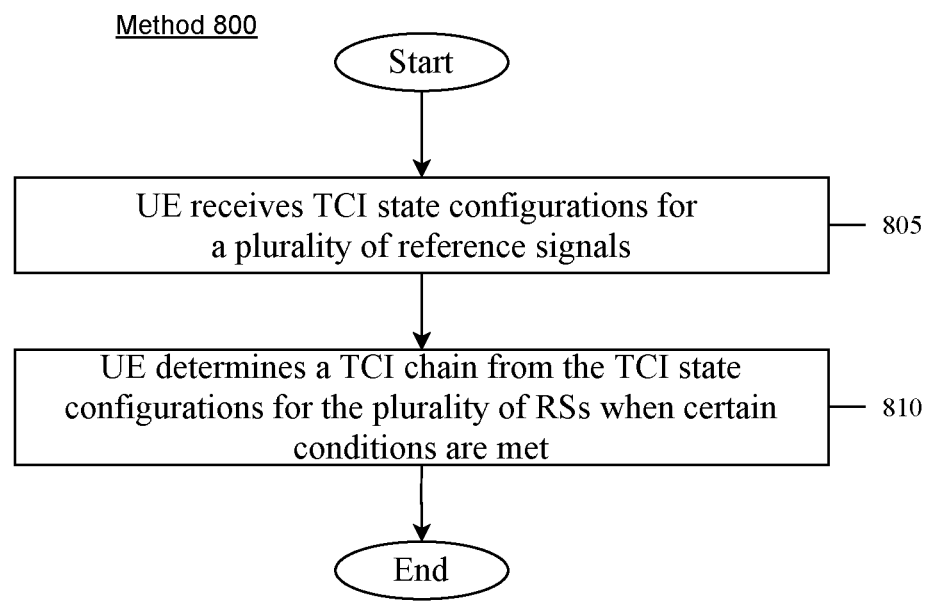
FIG. 8 shows a method for configuring a TCI state chain according to various exemplary embodiments described herein.

FIG. 8 shows a method 800 for configuring a TCI state chain according to various exemplary embodiments described herein. In 805, a UE receives TCI state configurations for a plurality of reference signals, e.g., at least three RS. A first state configuration may comprise a first port for a first signal being quasi-co-located (QCL) to a second port of a second signal. A second state configuration may comprise the second port of the second signal being QCL to a third port of a third signal. Further state configurations may also be configured for the UE.

As discussed above, the RSs corresponding to the TCI state configurations may include DLRS or ULRS components, or a mix of DLRS and ULRS. The RSs may be belong to an identical serving cell or different serving cells. When the RSs belong to different serving cells, the RS may belong to identical bands, or may belong to different bands that are subject to CBM.

In 810, the UE determines a TCI chain from the TCI state configurations for the plurality of RSs when certain conditions are met. When the TCI chain is formed, including e.g. the first, second and third signals discussed above, the channel measurements for each one of the first, second and third signals may be applied to each other one of the first, second and third signals.

As discussed above, regarding the conditions for forming a TCI chain, the TCI chain may have a maximum length X of four or more RS, X=4 or X=5. The maximum length X may be the same regardless of the components comprising the chain, e.g. UL components, DL components or a mix of UL and DL components. In another embodiment, the maximum length X may vary based on the components comprising the chain, e.g. a TCI chain comprising only DL or UL components has a maximum length of X, while a TCI chain comprising a mix of DL and UL components has a maximum length of X+1. Further, when the RSs comprise signals from different serving cells, to form a chain the RSs may be required to be on the same band or on CBM bands.

EXAMPLES

In a first example, a user equipment (UE) comprising a transceiver configured to communicate with a network and a processor communicatively coupled to the transceiver and configured to perform operations is provided. The operations comprise receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals is an uplink (UL) signal.

In a second example, the UE of the first example, wherein the operations further comprise receiving a third TCI state configuration comprising the third port of the third signal being QCL to a fourth port of a fourth signal so that the TCI chain comprises the first, second, third and fourth signals, and wherein at least one of the first, second, third or fourth signals is an uplink (UL) signal.

In a third example, the UE of the first example, wherein the at least one UL signal comprises a sounding reference signal (SRS), a random access channel (RACH), a physical uplink control channel (PUCCH), or a physical uplink shared channel (PUCCH).

In a fourth example, the UE of the first example, wherein at least one of the first, second or third signals is a downlink (DL) signal comprising a system synchronization block (SSB), a demodulation reference signal (DMRS) or a channel state information reference signal (CSI-RS).

In a fifth example, the UE of the first example, wherein a maximum number of signals in the TCI chain is greater than or equal to four.

In a sixth example, the UE of the first example, wherein, when the TCI chain includes UL signals only or DL signals only, a maximum number of signals in the TCI chain is X=4.

In a seventh example, the UE of the first example, wherein, when the TCI chain includes DL signals and UL signals, the maximum number of signals in the TCI chain is X>4.

In an eight example, the UE of the first example, wherein each of the plurality of signals belong to a same serving cell.

In a ninth example, the UE of the first example, wherein at least one of the plurality of signals belongs to a serving cell different from the other ones of the plurality of signals.

In a tenth example, the UE of the ninth example, wherein the TCI chain is formed when the plurality of signals are 1) in a band combination subject to common beam management (CBM) or 2) on an identical band.

In an eleventh example, the UE of the first example, wherein the signals in a single TCI chain are associated with a single QCL Type relationship that is QCL Type A, QCL Type B, QCL Type C or QCL Type D relationship.

In a twelfth example, the UE of the first example, wherein the TCI state configurations are indicated via a medium access control control element (MAC-CE), downlink control information (DCI), or a radio resource control (RRC) activation command.

In a thirteenth example, a user equipment (UE) comprising a transceiver configured to communicate with a network and a processor communicatively coupled to the transceiver and configured to perform operations is provided. The operations include receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal and determining a TCI chain comprising the first, second and third signals so that channel measurements for each one of the first, second and third signals are applied to channel measurements for each other one of the first, second and third signals, wherein at least one of the first, second or third signals belongs to a serving cell different from another one of the first, second or third signals.

In a fourteenth example, the UE of the thirteenth example, wherein the operations further comprise receiving a third TCI state configuration comprising the third port of the third signal being QCL to a fourth port of a fourth signal so that the TCI chain comprises the first, second, third and fourth signals.

In a fifteenth example, the UE of the thirteenth example, wherein the TCI chain is formed when the plurality of signals are in a band combination subject to common beam management (CBM).

In a sixteenth example, the UE of the thirteenth example, wherein the TCI chain is formed when the plurality of signals are on a common band.

In a seventeenth example, the UE of the thirteenth example, wherein at least one of the plurality of signals is an uplink (UL) signal comprising a sounding reference signal (SRS), a random access channel (RACH), a physical uplink control channel (PUCCH), or a physical uplink shared channel (PUCCH).

In a eighteenth example, the UE of the thirteenth example, wherein at least one of the plurality of signals is a downlink (DL) signal comprising a system synchronization block (SSB), a demodulation reference signal (DMRS) or a channel state information reference signal (CSI-RS).

In a nineteenth example, the UE of the thirteenth example, wherein a maximum number of signals in the TCI chain is greater than or equal to four.

In a twentieth example, the UE of the thirteenth example, wherein, when the TCI chain includes UL signals or DL signals only, a maximum number of signals in the TCI chain is X=4 and, when the TCI chain includes UL signals and DL signals, the maximum number of signals in the TCI chain is X>4.

In a twenty first example, the UE of the thirteenth example, wherein the signals in a single TCI chain are associated with a single QCL Type relationship that is QCL Type A, QCL Type B, QCL Type C or QCL Type D relationship.

In a twenty second example, the UE of the thirteenth example, wherein the TCI state configurations are indicated via a medium access control control element (MAC-CE), downlink control information (DCI), or a radio resource control (RRC) activation command.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) configured to perform operations comprising:
   receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal; and
   determining a TCI chain comprising the first, second and third signals so that channel measurements for each one of the first, second and third signals are applied to channel measurements for each other one of the first, second and third signals,
   wherein at least one of the first, second or third signals is an uplink (UL) signal.

2. The processor of claim 1, wherein the operations further comprise:
   receiving a third TCI state configuration comprising the third port of the third signal being QCL to a fourth port of a fourth signal so that the TCI chain comprises the first, second, third and fourth signals, and wherein at least one of the first, second, third or fourth signals is an uplink (UL) signal.

3. The processor of claim 1, wherein the at least one UL signal comprises a sounding reference signal (SRS), a random access channel (RACH), a physical uplink control channel (PUCCH), or a physical uplink shared channel (PUSCH).

4. The processor of claim 1, wherein at least one of the first, second or third signals is a downlink (DL) signal comprising a system synchronization block (SSB), a demodulation reference signal (DMRS) or a channel state information reference signal (CSI-RS).

5. The processor of claim 1, wherein a maximum number of signals in the TCI chain is greater than or equal to four.

6. The processor of claim 1, wherein, when the TCI chain includes UL signals only or DL signals only, a maximum number of signals in the TCI chain is X=4.

7. The processor of claim 1, wherein, when the TCI chain includes DI, signals and UL signals, a maximum number of signals in the TCI chain is X>4.

8. The processor of claim 1, wherein each of the plurality of signals belong to a same serving cell.

9. The processor of claim 1, wherein at least one of the plurality of signals belongs to a serving cell different from the other ones of the plurality of signals, and
wherein the TCI chain is formed when the plurality of signals are 1) in a band combination subject to common beam management (CBM) or 2) on an identical band.

10. The processor of claim 1, wherein the signals in a single TCI chain are associated with a single QCL Type relationship that is QCL Type A, QCL Type B, QCL Type C or QCL Type D relationship.

11. The processor of claim 1, wherein the TCI state configurations are indicated via a medium access control control element (MAC-CE), downlink control information (DCI), or a radio resource control (RRC) activation command.

12. A processor of a user equipment (UE) configured to perform operations comprising:
receiving TCI state configurations for a plurality of signals, wherein a first state configuration comprises a first port for a first signal being quasi-co-located (QCL) to a second port of a second signal and a second state configuration comprises the second port of the second signal being QCL to a third port of a third signal; and
determining a TCI chain comprising the first, second and third signals so that channel measurements for each one of the first, second and third signals are applied to channel measurements for each other one of the first, second and third signals,
wherein at least one of the first, second or third signals belongs to a serving cell different from another one of the first, second or third signals.

13. The processor of claim 12, wherein the operations further comprise:
receiving a third TCI state configuration comprising the third port of the third signal being QCL to a fourth port of a fourth signal so that the TCI chain comprises the first, second, third and fourth signals.

14. The processor of claim 12, wherein the TCI chain is formed when the plurality of signals are in a band combination subject to common beam management (CBM).

15. The processor of claim 12, wherein the TCI chain is formed when the plurality of signals are on a common band.

16. The processor of claim 12, wherein at least one of the plurality of signals is an uplink (UL) signal comprising a sounding reference signal (SRS), a random access channel (RACH), a physical uplink control channel (PUCCH), or a physical uplink shared channel (PUSCH).

17. The processor of claim 12, wherein at least one of the plurality of signals is a downlink (DL) signal comprising a system synchronization block (SSB), a demodulation reference signal (DMRS) or a channel state information reference signal (CSI-RS).

18. The processor of claim 12, wherein, when the TCI chain includes UL signals or DL signals only, a maximum number of signals in the TCI chain is X=4 and, when the TCI chain includes UL signals and DL signals, the maximum number of signals in the TCI chain is X>4.

19. The processor of claim 12, wherein the signals in a single TCI chain are associated with a single QCL Type relationship that is QCL Type A, QCL Type B, QCL Type C or QCL Type D relationship.

20. The processor of claim 12, wherein the TCI state configurations are indicated via a medium access control control element (MAC-CE), downlink control information (DCI), or a radio resource control (RRC) activation command.

* * * * *